(12) United States Patent
Ghosh et al.

(10) Patent No.: US 11,995,184 B2
(45) Date of Patent: May 28, 2024

(54) LOW-LATENCY DIGITAL SIGNATURE PROCESSING WITH SIDE-CHANNEL SECURITY

(71) Applicant: Intel Corporation, Santa Clara, CA (US)

(72) Inventors: Santosh Ghosh, Hillsboro, OR (US); Andrea Basso, London (GB); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 233 days.

(21) Appl. No.: 17/484,870

(22) Filed: Sep. 24, 2021

(65) Prior Publication Data

US 2022/0012334 A1  Jan. 13, 2022

(51) Int. Cl.
*G06F 21/55* (2013.01)
*G06F 7/72* (2006.01)
(Continued)

(52) U.S. Cl.
CPC ............ *G06F 21/556* (2013.01); *G06F 7/724* (2013.01); *G06F 21/64* (2013.01); *G06F 21/75* (2013.01); *H04L 9/003* (2013.01); *H04L 9/3093* (2013.01); *H04L 9/3247* (2013.01); *G06F 2207/7223* (2013.01)

(58) Field of Classification Search
CPC ........ G06F 21/556; G06F 7/724; G06F 21/64; G06F 21/75; G06F 2207/7223; H04L 9/003; H04L 9/3093; H04L 9/3247; H04L 9/32; H04L 9/30; H04L 9/3026
See application file for complete search history.

(56) References Cited

U.S. PATENT DOCUMENTS 11,496,297 B1 * 11/2022 Beckwith .............. H04L 9/3093
11,870,881 B2 * 1/2024 Khedr ..................... H04L 9/008
(Continued)

FOREIGN PATENT DOCUMENTS

| CN | 115859314 A | 3/2023 |
| EP | 4156597 A1 | 3/2023 |
| IN | 202244048279 | 3/2023 |

OTHER PUBLICATIONS

Extended European Search Report for EP22191395.7 dated Jan. 30, 2023, 7 pages.
(Continued)

*Primary Examiner* — Shaqueal D Wade-Wright
(74) *Attorney, Agent, or Firm* — JAFFERY WATSON MENDONSA & HAMILTON LLP (57) ABSTRACT

A low-latency digital-signature with side-channel security is described. An example of an apparatus includes a coefficient multiplier circuit to perform polynomial multiplication, the coefficient multiplier circuit providing Number Theoretic Transform (NTT) and INTT (Inverse NTT) processing; and one or more accessory operation circuits coupled with the coefficient multiplier circuit, each of the one or more accessory operation circuits to perform a computation based at least in part on a result of an operation of the NTT/INTT coefficient multiplier circuit, wherein the one or more accessory operation circuits are to receive results of operations of the NTT/INTT coefficient multiplier circuit prior to the results being stored in a memory.

21 Claims, 9 Drawing Sheets (51) Int. Cl.
*G06F 21/64* (2013.01)
*G06F 21/75* (2013.01)
*H04L 9/00* (2022.01)
*H04L 9/30* (2006.01)
*H04L 9/32* (2006.01)

(56) References Cited

U.S. PATENT DOCUMENTS

2019/0312728 A1* 10/2019 Poeppelmann ....... H04L 9/3093
2022/0182220 A1* 6/2022 Shin ...................... H04L 9/0637
2023/0318829 A1* 10/2023 Sim ....................... H04L 9/0852

OTHER PUBLICATIONS

Leo Ducas et al: "Crystals—Dilithium: Digital Signatures from Module Lattices", IACR, International Association for Cryptologic Research, vol. Sep. 10, 2018:112250 Sep. 10, 2018 (Sep. 10, 2018), pp. 1-31, XP061026325, Retrieved from the Internet: URL:http://eprint.iacr.org/2017/633.pdf [retrieved on Sep. 10, 2018].

Ravi Prasanna et al: "On Configurable SCA Countermeasures Against Single Trace Attacks for the NTT", 16th European Conference—Computer Vision—ECCV 2020, pp. 123-146, XP047573834.

Ricci Sara Ricci@Feec Vutbr CZ et al: "Implementing Crystals—Dilithium Signature Scheme on FPGAs", The 16th International Conference on Availability, Reliability and Security, ACMPUB27, New York, NY, USA, Aug. 17, 2021 (Aug. 17, 2021), pp. 1-11, XP058656252, DOI: 10.1145/3465481.3465756 ISBN: 978-1-4503-8950-1.

* cited by examiner

Gen
01 $\zeta \leftarrow \{0,1\}^{256}$
02 $(\rho, \rho', K) \in \{0,1\}^{256} \times \{0,1\}^{512} \times \{0,1\}^{256} := H(\zeta)$ ▷ H is instantiated as SHAKE-256
03 $\hat{A} \in R_q^{k \times \ell} := \text{ExpandA}(\rho)$ ▷ A is generated and stored in NTT Representation as $\hat{A}$
04 $(s_1, s_2) \in S_\eta^\ell \times S_\eta^k := \text{ExpandS}(\rho')$
05 $t := As_1 + s_2$ ▷ Compute $As_1$ as $\text{NTT}^{-1}(\hat{A} \cdot \text{NTT}(s_1))$
06 $(t_1, t_0) := \text{Power2Round}(t, d)$
07 $tr \in \{0,1\}^{256} := H(\rho \| t_1)$
08 return $(pk = (\rho, t_1), sk = (\rho, K, tr, s_1, s_2, t_0))$

FIG. 5A

```
Sign(sk, M)
09  A ∈ R_q^{k×ℓ} := ExpandA(ρ)                    ▷ A is generated and stored in NTT Representation as Â
10  μ ∈ {0,1}^{512} := H(tr ∥ M)
11  κ := 0, (z,h) := ⊥
12  ρ' ∈ {0,1}^{512} := H(K ∥ μ) (or ρ' ← {0,1}^{512} for randomized signing)
13                                                  ▷ Pre-compute ŝ_1 := NTT(s_1), ŝ_2 := NTT(s_2), and t̂_0 := NTT(t_0)
14  while (z,h) = ⊥ do
15    y ∈ S̃_γ^ℓ := ExpandMask(ρ', κ)
16    w := Ay
17    w := HighBits_q(w, 2γ_2)                      ▷ w := NTT^{-1}(Â · NTT(y))
18    c ∈ {0,1}^{256} := H(μ ∥ w_1)
19    c ∈ B_60 := SampleInBall(c)
                                                    ▷ Store c in NTT representation as ĉ := NTT(c)
20    z := y + cs_1                                 ▷ Compute cs_1 as NTT^{-1}(ĉ · ŝ_1)
21    (r_0, r_1) := LowBits_q(w − cs_2, 2γ_2)       ▷ Compute cs_2 as NTT^{-1}(ĉ · ŝ_2)
22    if ‖z‖_∞ ≥ γ_1 − β or ‖r_0‖_∞ ≥ γ_2 − β, then (z,h) := ⊥
23    else
24      h := MakeHint_q(−ct_0, w − cs_2 + ct_0, 2γ_2)  ▷ Compute ct_0 as NTT^{-1}(ĉ · t̂_0)
25      if ‖ct_0‖_∞ ≥ γ_2 or the # of 1's in h is greater than ω, then (z,h) := ⊥
26    κ := κ + ℓ
27  return σ = (c, z, h)
```

FIG. 5B

Verify($pk, M, \sigma = (c, z, h)$)

27: $A \in R_q^{k \times \ell} :=$ ExpandA($\rho$) ▷ A is generated and stored in NTT Representation as $\hat{A}$
28: $\mu \in \{0,1\}^{512} := H(H(\rho \| t_1) \| M)$
29: $c :=$ SampleInBall($\tilde{c}$)
30: $w_1' :=$ UseHint($h, Az - ct_1 \cdot 2^d, 2\gamma_2$) ▷ Compute as $NTT^{-1}(\hat{A} \cdot NTT(z) - NTT(c) \cdot NTT(t_1 \cdot 2^d))$
31: return $[\|z\|_\infty < \gamma_1 - \beta]$ and $[\tilde{c} = H(\mu \| w_1')]$ and $[\# \text{ of 1's in } h \text{ is } \leq \omega]$

LOW-LATENCY DIGITAL SIGNATURE PROCESSING WITH SIDE-CHANNEL SECURITY

TECHNICAL FIELD

Embodiments described herein generally relate to the field of electronic devices and, more particularly, low-latency digital signature processing with side-channel security.

BACKGROUND

Quantum computing is expected to enable attackers to solve problems that were previously impractical to attempt, including the solving of cryptographic mathematics. Attacks may utilize side channels to obtain signals from cryptographic computation, and apply quantum computing to determine secret values. As a result, any existing cryptographic methods may potentially be broken.

Dilithium (Crystals-Dilithium) is a lattice based post-quantum digital signature protocol that is a finalist in the National Institute of Standards and Technology (NIST) Post-Quantum Cryptography (PQC) standardization competition. Such technology is expected to provide greatly improved security in digital signature technology.

However, the Dilithium technology requires high levels of computations in polynomial multiplication, and thus will be challenging to implement efficiently for security applications, particularly in devices with limited resources.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to a low-latency digital signature processing with side-channel security.

Public key cryptography, also referred to as asymmetric cryptography, is in general a cryptographic system that uses pairs of keys in encryption, the pairs including public keys that may be publicly known and private keys that are securely maintained and only known by the key owner. The key pairs are generated utilizing cryptographic algorithms that are based on difficult mathematical problems.

It is expected that classical public-key cryptography, such as Elliptic Curve Cryptography (ECC), Elliptic Curve Digital Signature Algorithm (ECDSA), Diffie-Hellman (DH), Rivest Shamir Adleman (RSA), and Digital Signature Algorithm (DSA), will be broken by quantum computers, referring to computers that exploit properties of quantum states to perform computation. Further, adversaries may be currently mining data from cryptographic operations to implement when sufficient quantum computing technology is available.

For this reason, Post-Quantum Cryptography Standardization is a program and competition by the National Institute of Standards and Technology (NIST) to update their standards to include post-quantum cryptography. However, there is a pressing need to develop post quantum secure KEM solutions as soon as possible.

In lattice calculation for cryptographic operations, one secret polynomial is multiplied with another public polynomial. The multiplication consists of multiplying each coefficient of the secret polynomial with a respective element of the public polynomial. The polynomials may be degree-256 polynomials in a post quantum implementation. Multiplication between two such polynomials is the main compute intensive operation for key-generation, encapsulation, and decapsulation. In particular, Dilithium is a lattice based post-quantum digital signature protocol that may be implemented in post quantum technology.

However, Dilithium operation requires a high level of processing. Dilithium requires approximately 11 million cycles for a single sign operation on a 32-bit MCU (microcontroller), which can be a serious impediment to enabling post-quantum secure digital signature for a significant number of resource constrained devices, such as IoT (Internet of Things) apparatuses. Further, serial execution of secret dependent operations on a microcontroller may be highly vulnerable to side-channel attacks that exploit, for example, electro-magnetic (EM) and power signals.

Polynomial multiplication in Dilithium is computed using the Number Theoretic Transform algorithm (NTT). The NTT algorithm operates to transform a polynomial a(x) into its NTT form ã(x). Following such transformation, multiplication between polynomials in the NTT form corresponds to coefficient-wise multiplication between polynomials in the NTT form. Thus, it is possible to compute the product between a(x) and b(x) as INTT(NTT(a(x))×NTT(b(x))), where INTT denotes the inverse NTT (i.e. INTT(NTT(a)) =a) and x×y denotes the coefficient-wise multiplication between x and y.

In some embodiments, an apparatus, system, or process provides for improved performance and security utilizing modified calculation circuitry or processing. In some embodiments, an architecture of an apparatus or system includes circuit blocks that compute accessory computations on the output of an NTT/INTT core prior to such outputs being saved to memory. This assists in reducing the multiple read/write access on the memory, incurring less power consumption, and requiring smaller silicon area.

In some embodiments, the circuitry or process for accessory operations is configured such that the accessory operations can be computed within a same cycle of NTT/INTT operation. This back-to-back execution approach within the same cycle diffuses the correlated side-channels (power/ EM) among one or more other operations that overlap at least in part with the accessory operations, providing inbuilt robustness to side-channel attack without requiring area, power, or latency penalties.

Thus, an embodiment may be utilized to allow reduced latency because of the reduction in memory read and write operations, and improved resistance to side-channel attacks because the actual correlated signal is diffused, and the SNR (Signal to Noise Ratio) is highly reduced.

Figure 1:
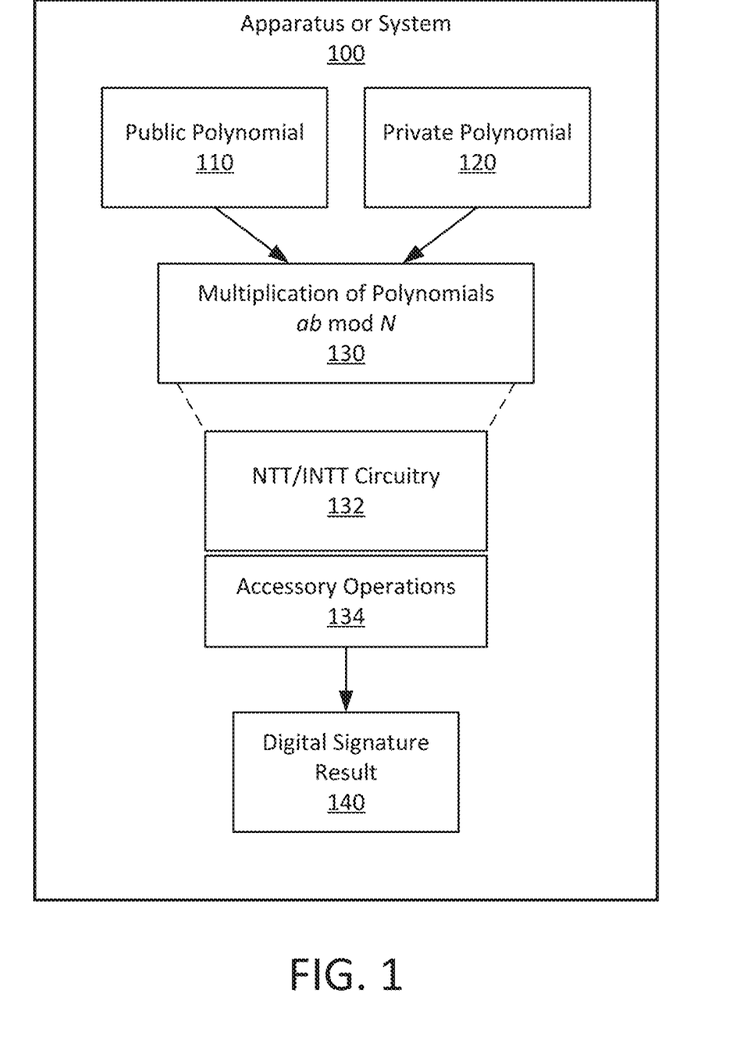
FIG. 1 is an illustration of a system or apparatus to generate a digital signature, according to some embodiments.

FIG. 1 is an illustration of a system or apparatus to generate a digital signature, according to some embodiments. In this illustration, an apparatus or system 100 is to provide cryptographic functions including generation of a digital signature output. The apparatus or system 100 may be part of a secure circuit in a processor or in a separate circuit, such as an accelerator or other element. The apparatus or system 100 includes NTT/INTT circuitry 132 to support the multiplication of polynomials 130, shown as ab mod N. In a particular implementation, such as in Dilithium calculation in which there is a multiplication of a public polynomial 110 by a private polynomial 120 in the modulus form ab mod q, the polynomial multiplication includes application of an NTT algorithm, which may include in operation of the NTT/INTT circuitry 132.

In some embodiments, the apparatus or system 100 further includes one or more accessory operations 134 in the operation, which provides a digital signature result. As further described herein, the accessory operations may include, but are not limited to, Power2Round (to provide rounding), HighBits, LowBits, and MakeHint. Such accessory operations are based on outputs of the NTT/INTT circuitry 132, which are stored to computer memory (which is not shown in this illustration).

However, the very high number of calculations in the Dilithium technology creates a significant write and read burden in which results that are generated by the NTT/INTT circuitry 132 and written to memory, and then are read again from the memory for the handling of the accessory operations.

In some embodiments, the apparatus or system 100 allows for the accessory operations 134 to receive outputs from the NTT/INTT circuitry 132 prior to saving such outputs in memory, thereby avoiding the additional action to read the data from memory after the operation. In this manner, the apparatus or system 100 operates to reduce memory cycles in the generation of a digital signature result 140.

In some embodiments, the apparatus or system 100 is further configured such that the accessory operations 134 are computed within a same cycle of NTT/INTT operation, which thus further diffuses the correlated side-channels (power/EM) among other operations and provides additional protection from side-channel attack.

Figure 2:
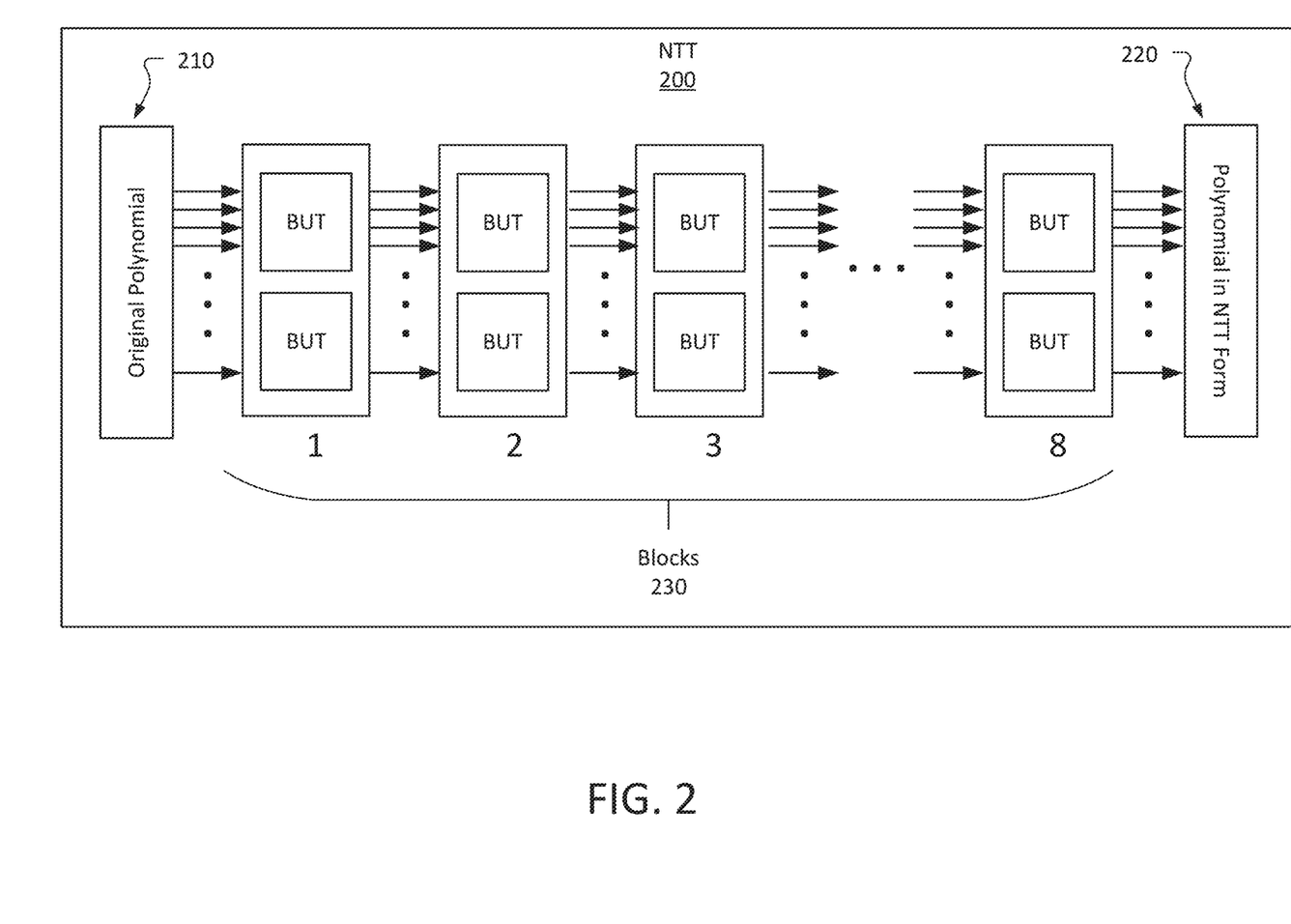
FIG. 2 is an illustration of an NTT algorithm operation that may be utilized in digital signature operation, according to some embodiments.

FIG. 2 is an illustration of an NTT algorithm operation that may be utilized in digital signature operation, according to some embodiments. At the core of the NTT algorithm is a butterfly operation that receives two coefficients and one constant value, and outputs the new values of the coefficients. Implementation of the butterfly operation commonly follows the Cooley-Tukey (CT) algorithm for the forward NTT and Gentleman-Sande (GS) algorithm for the inverse NTT. This is possible because the inverse NTT algorithm is very similar to the forward NTT one, with the main difference being the butterfly operation. The NTT operates on all coefficients of one polynomial several times. After eight repetitions (because polynomials in Dilithium have 256 coefficients) of the butterfly operation on all coefficients (with different pairs at each repetition), the NTT result is produced. Thus, the NTT function consists of blocks 230 of 128/n (where n is the number of butterfly units) cycles, where each cycle in a block contains independent operations, i.e. the result of one operation does not depend on the result of any other computation in the same block.

This operation is summarized in FIG. 2. As illustrated, an NTT algorithm includes blocks 230 (shown as Block 1 through Block 8). In operation, the NTT algorithm is to receive an original polynomial 210 for processing by the blocks 230 to generate the resulting polynomial in NTT form 220 that may be utilized in a multiplication of polynomials.

The block that computes polynomial multiplication via NTT, inverse NTT and coefficient-wise multiplication is constantly writing and reading from memory. In the last 64 cycles, the coefficients that are written to memory are the final result.

In lattice digital signature algorithms for cryptographic operations, one secret polynomial is multiplied with another public polynomial. The multiplication consists of sequentially multiplying each coefficient of the secret polynomial with a respective element of the public polynomial. The polynomials may be degree-256 polynomials in a post quantum implementation. Multiplications between two such polynomials is the main compute intensive operation for key-generation, sign, and verify. The mathematical operation utilizes modular arithmetic, referring to a system of arithmetic for integers where numbers wrap around when reaching a certain value, called the modulus.

In some embodiments, an apparatus, system, or process is to provide improved NTT/INTT usage in polynomial multiplication in digital signature operation, In some embodiments, the apparatus, system, or process is to provide for receiving results of NTT/INTT operations for accessory computations prior to storage in memory to reduce writing and reading cycles in memory.

Figure 3:
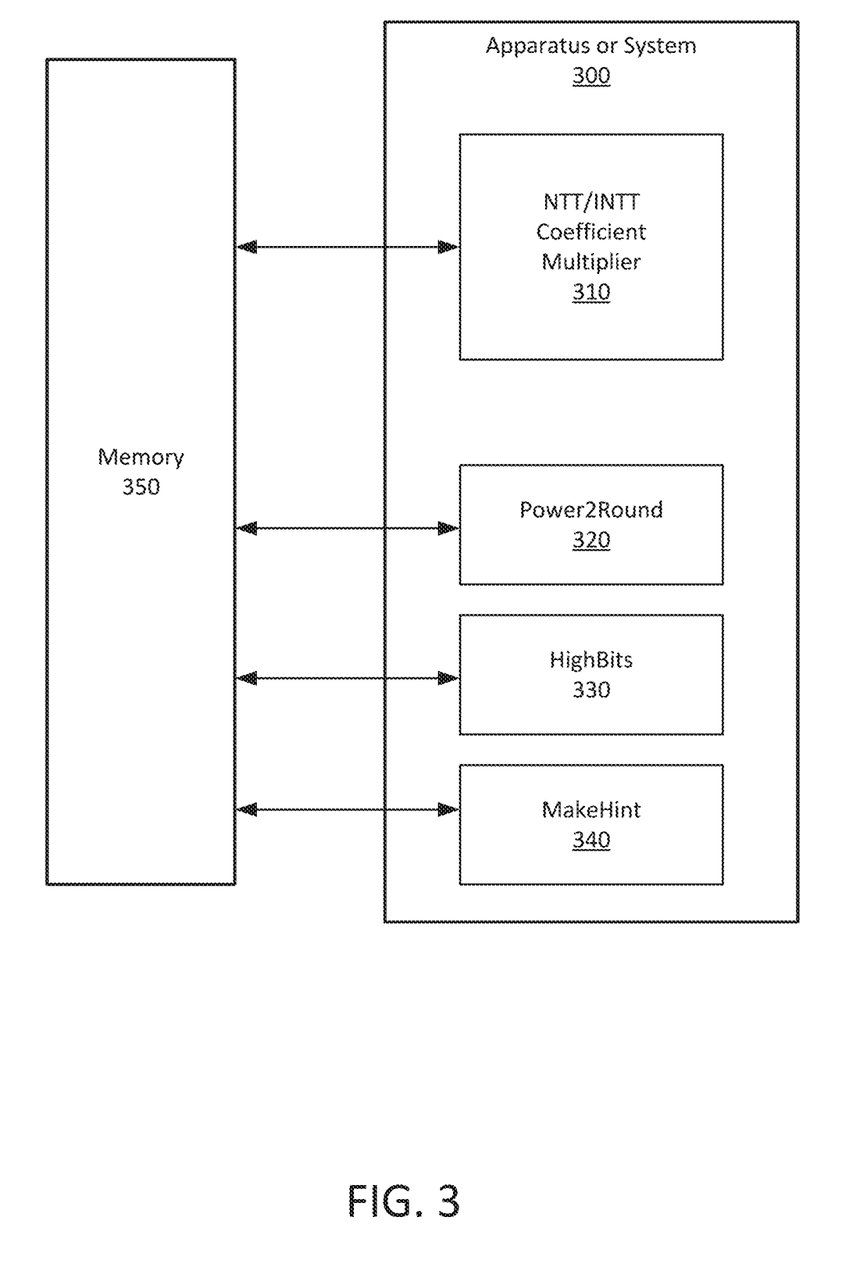
FIG. 3 is an illustration of an apparatus to support polynomial multiplication in digital signature generation.

FIG. 3 is an illustration of an apparatus to support polynomial multiplication in digital signature generation. As illustrated, an apparatus or system 300 includes (among other elements) an NTT/INTT coefficient multiplier circuit 310 to support polynomial multiplication. Also included are multiple accessory operations (which may be implemented in one or more circuits) that are applied in the Dilithium digital signature operations. The accessory operation circuits may include, but are not limited to, Power2Round 320, HighBits 330, and MakeHint 340.

As shown in FIG. 3, the apparatus or system 300 is communicatively coupled with memory 350, which may include varying types of memory devices in one or more locations. The NTT/INTT coefficient multiplier circuit 310 is to read data from the memory 350 and to write results back to the memory 350. Further, the Power2Round 320, HighBits 330, and MakeHint 340 accessory operation circuits are each to read data from the memory 350 for processing and write results back to the memory.

Figure 5A:
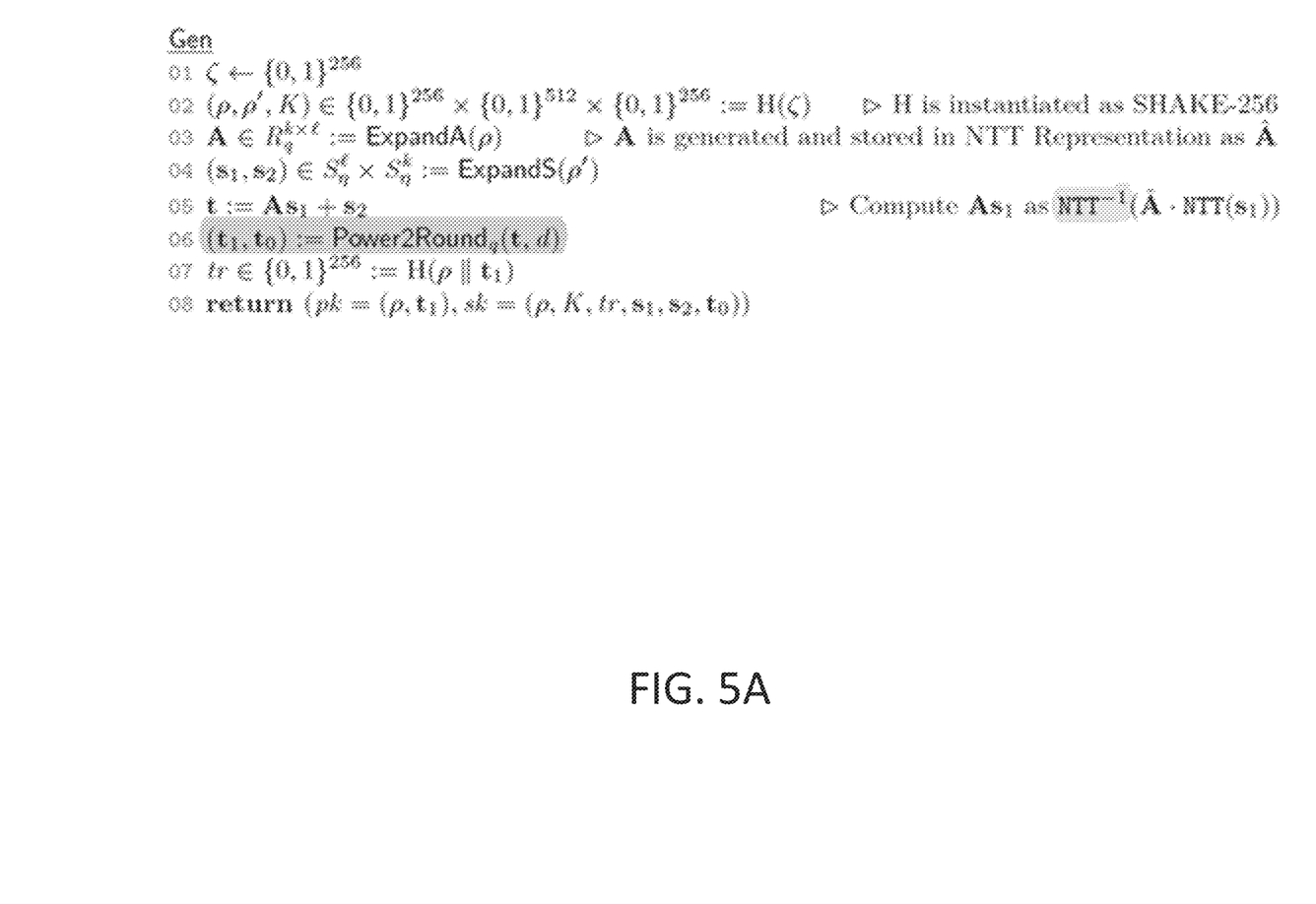
FIGS. 5A-5C illustrate algorithms for processing for polynomial multiplication in Dilithium digital signature generation, according to some embodiments.
Figure 5B:
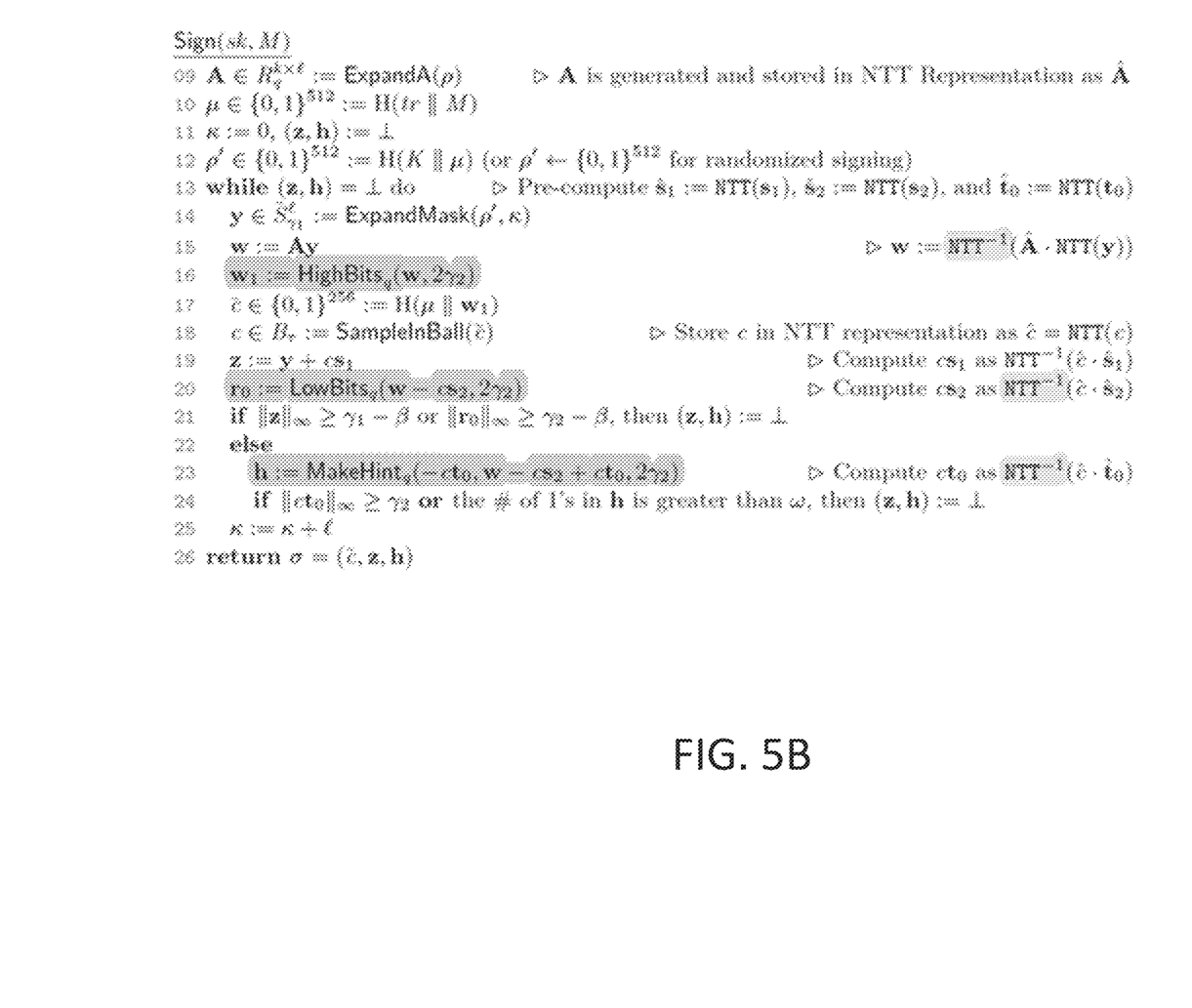
Figure 5C:
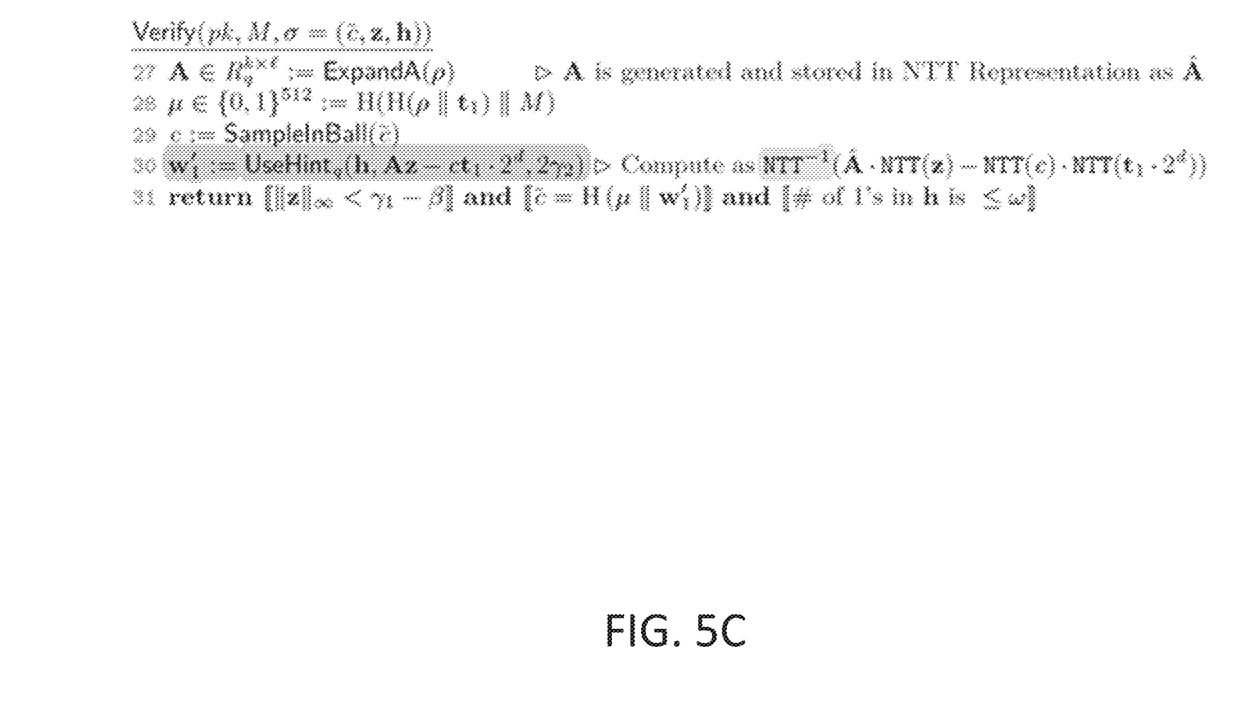

However, as further illustrated in the code provided in FIGS. 5A-5C, the accessory calculations are based at least in part on results generated by the NTT/INTT coefficient multiplier circuit 310. For this reason, the performance of the necessary calculations in the apparatus or system 300 requires a high level of memory cycles in which data is written to memory and then read again from such memory for each of the accessory operations.

Figure 4:
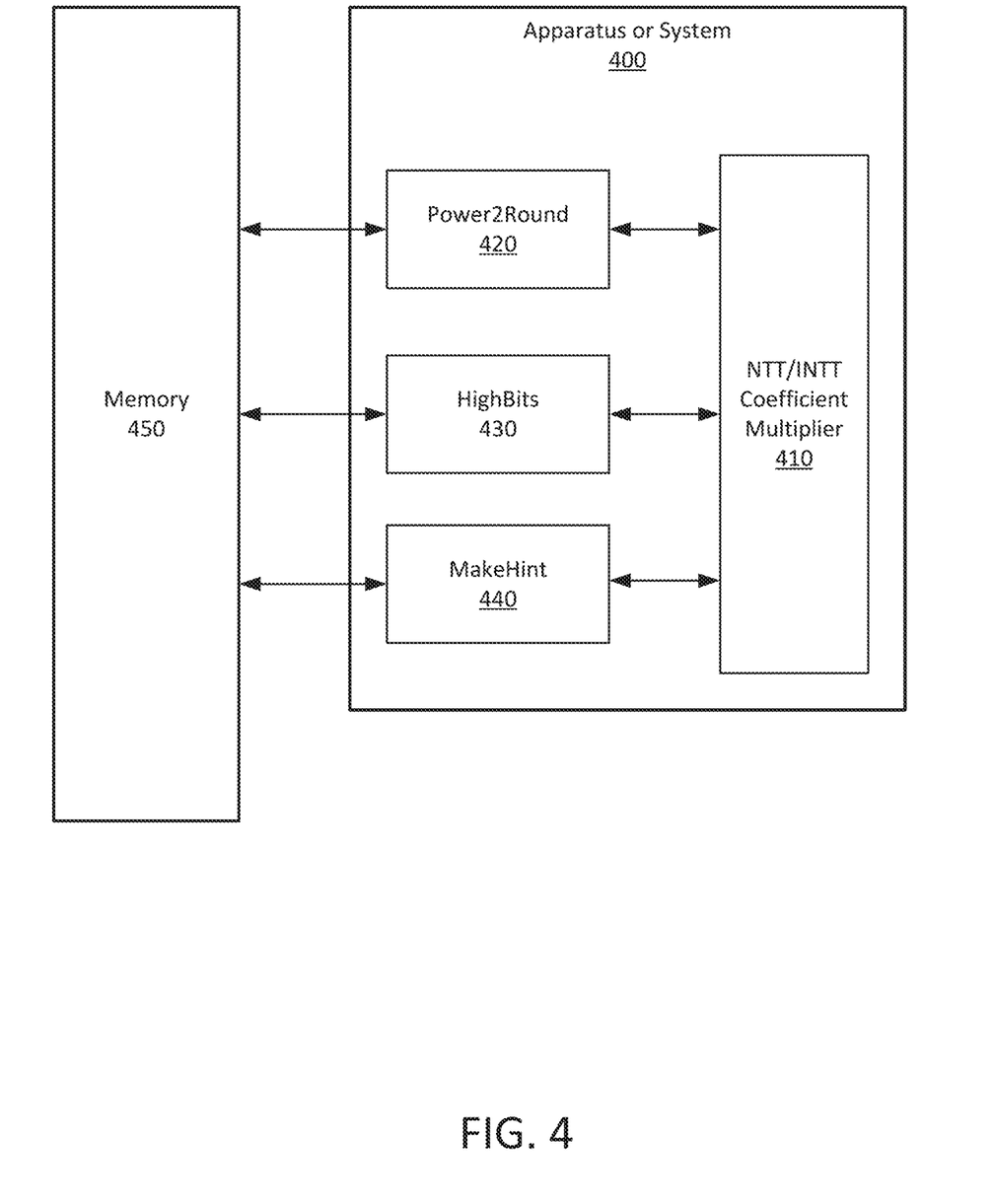
FIG. 4 is an illustration of an apparatus to support improved operation in polynomial multiplication for digital signature generation, according to some embodiments.

FIG. 4 is an illustration of an apparatus to support improved operation in polynomial multiplication for digital signature generation, according to some embodiments. As illustrated, an apparatus or system 400 includes (among other elements) an NTT/INTT coefficient multiplier circuit 410 to support polynomial multiplication. Also included are multiple accessory operations (which may be implemented in one or more circuits) that are applied in the Dilithium digital signature operations. The accessory operation circuits may include, but are not limited to, Power2Round 420, HighBits 430, and MakeHint 440.

As shown in FIG. 4, the apparatus or system 400 is communicatively coupled with memory 450. The NTT/INTT coefficient multiplier circuit 310 is to read data from the memory 450 and to write results back to the memory 450. Further, the Power2Round 420, HighBits 430, and MakeHint 440 accessory operation circuits are each to read data from the memory 450 for processing and write results back to the memory 450.

In contrast with FIG. 3, the apparatus or system 400 is constructed to provide for improved performance and security utilizing modified calculation circuitry. In some embodiments, an architecture of an apparatus or system 400 includes accessory operation circuit blocks 420, 430, and 440 that compute the accessory calculations based on the output of the NTT/INTT core 410 before such results are saved to memory 450. This assists in reducing the multiple read/write access on the memory 450, incurring less power consumption and requiring smaller silicon area. In some embodiments, the apparatus or system 400 is further configured such that the accessory operation circuit blocks 420, 430, and 440 are computed within a same cycle of NTT/INTT operation, which thus diffuses the correlated side-channels (power/EM) among other operations and provides additional protection from side-channel attack.

FIGS. 5A-5C illustrate algorithms for processing for polynomial multiplication in Dilithium digital signature generation, according to some embodiments. In such figures, FIG. 5A provides an algorithm for Key Generation; FIG. 5B provides an algorithm for Signing with a digital signature; and FIG. 5C provides an algorithm for Verifying a digital signature.

As seen in FIGS. 5A-5C, each of the accessory computations (shaded in the algorithm) in Dilithium take place on the result of the inverse NTT (shaded). As described above, the block that computes polynomial multiplication via NTT, inverse NTT and coefficient-wise multiplication is constantly writing and reading from memory. In the last 64 cycles, the coefficients that are written to memory are the final result. In some embodiments, an apparatus, system, or process is to compute the accessory computations, such as Power2Round, HighBits, and MakeHint, in the last 64 cycles of the inverse NTT computations and directly write to memory the processed values.

More specifically, Power2Round is provided in line 6 of the Key Generation algorithm in FIG. 5A. Existing technologies compute the inverse NTT and store the result in memory. Such technologies then read As1 and s2 from memory and then write As1+s2 back to memory. Following this, these will read t again, compute Power2Round(t, d) (here d is a constant) and write t1 and t0 back to memory.

In some embodiments, while computing the inverse NTT, an apparatus, system, or process is to also load s2 and compute Power2Round(As1+s2) after the final coefficients of As1 are computed and before these are stored to memory. In this way, the apparatus, system, or process directly writes the final value, and thus reduces the latency as well as the area consumption.

The same considerations apply to the other computational blocks: HighBits, LowBits, MakeHint, and UseHint. These blocks all follow an inverse NTT computation. In some embodiments, the latency of such computational blocks are optimized through reducing the memory read/write operations by pipelining these with the corresponding inverse NTT.

More specifically, an embodiment is to compute HighBits (line 16) together with the inverse NTT of line 15 in FIG. 5B, LowBits together with the subtraction operation within its argument (line 20) and together with the inverse NTT in line 20 in FIG. 5B. Similarly, MakeHint is computed together with the subtraction operations within its argument and the inverse NTT in line 23 in FIG. 5B, and UseHint (line 30) is computed together with the inverse NTT of the same line in FIG. 5C.

From a side-channel security perspective, Power2Round, HighBits and LowBits are all secret-depending. In some embodiments, an apparatus, system, or process is to compute these sensitive blocks in parallel with the INTT (thus increasing noise) and as a result the blocks inherit one or more side-channel attack countermeasures directly from the INTT, without requiring any additional logic. In some embodiments, the one or more inherited side-channel attack measures include shuffling of processing order, which provides randomization in operation.

Figure 6:
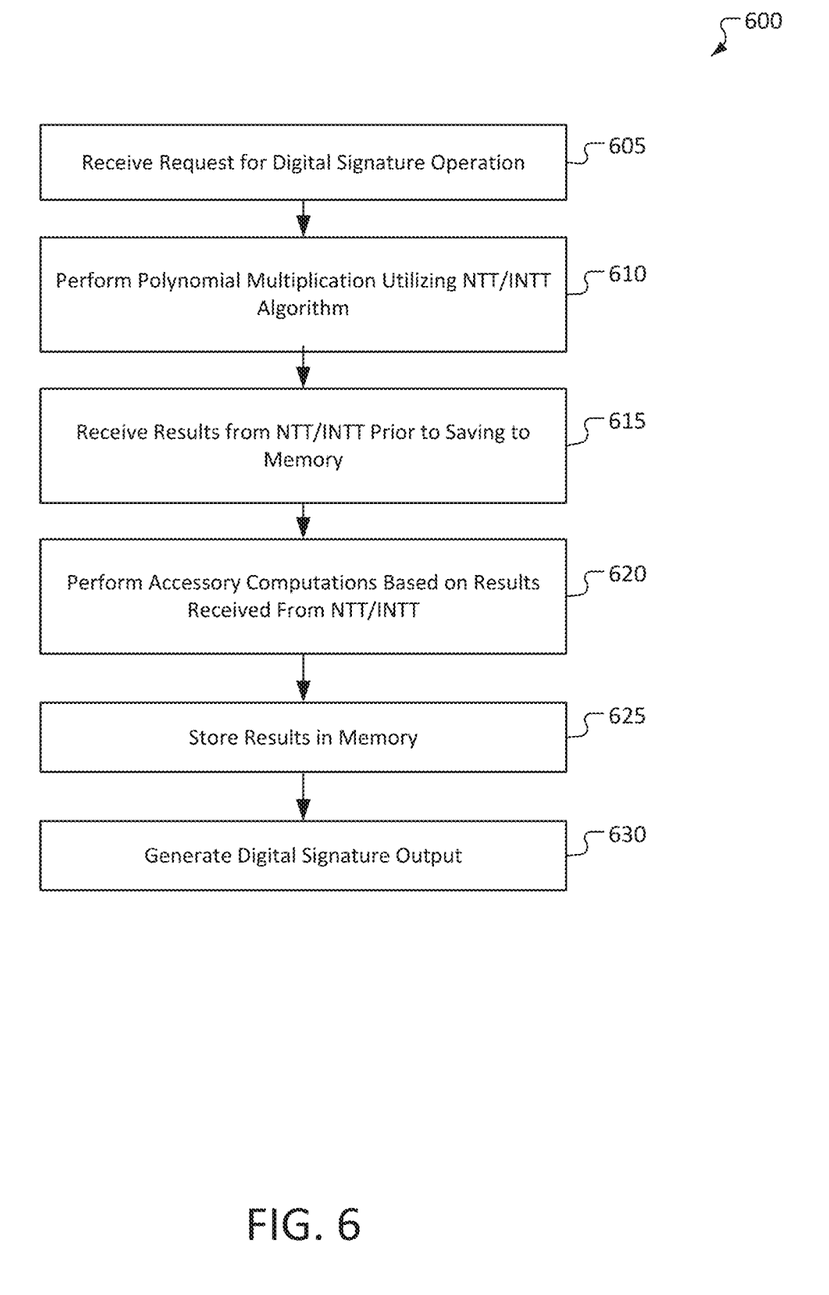
FIG. 6 is an illustration of a process for digital signature operation, according to some embodiments.

FIG. 6 is an illustration of a process for digital signature operation, according to some embodiments. In a process 600, a request is received for a digital signature operation 605, wherein the operation may include Dilithium technology. In such operation a polynomial multiplication is performed utilizing an NTT/INTT algorithm 610.

In some embodiments, one or more results are received from the NTT/INTT algorithm processing prior to saving such results in memory 615. Further, one or more accessory computations are performed based on such results 620, wherein the accessory computations may include one or more of Power2Round, HighBits, LowBits, MakeHint, and UseHint. In some embodiments, the accessory computations are computed within a same cycle of NTT/INTT operation.

In some embodiments, the operation then proceeds with saving the results of the computations in memory 625, and generating a digital signature output from the Dilithium processing 630.

Figure 7:
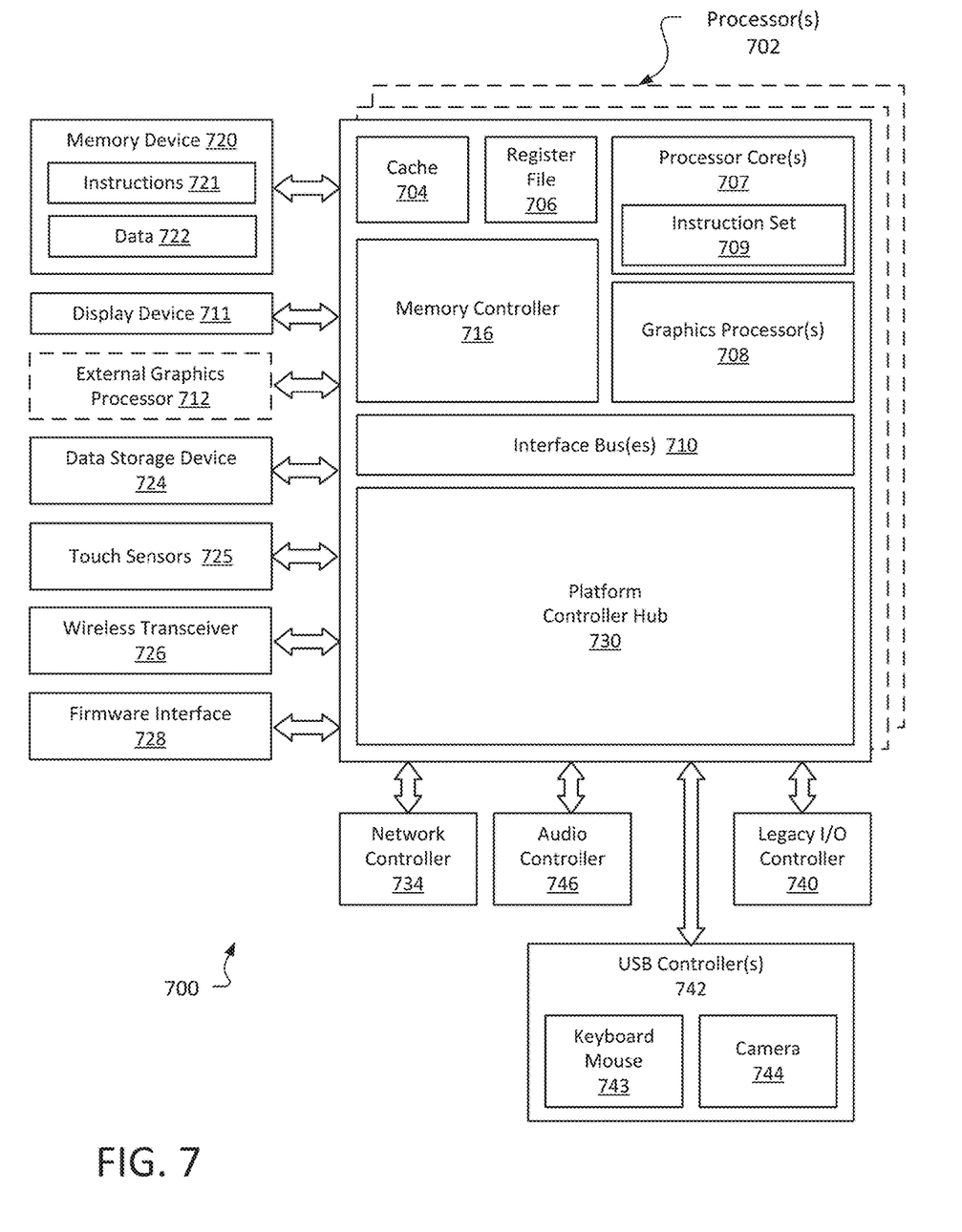
FIG. 7 illustrates an embodiment of an exemplary computing architecture for operations including low-latency digital signature processing with side-channel security, according to some embodiments.

FIG. 7 illustrates an embodiment of an exemplary computing architecture for operations including low-latency digital signature processing with side-channel security, according to some embodiments. In various embodiments as described above, a computing architecture 700 may comprise or be implemented as part of an electronic device.

In some embodiments, the computing architecture 700 may be representative, for example, of a computer system that implements one or more components of the operating environments described above. The computing architecture 700 may be utilized to provide low-latency digital signature processing with side-channel security, such as described in FIGS. 1-6. In some embodiments, the computing architecture 700 allows for the accessory operations to receive outputs from NTT/INTT circuitry prior to saving such outputs in memory, thereby avoiding the additional action to read the data from memory after the operation, and further is configured such that accessory operations are computed within a same cycle of NTT/INTT operation.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, an apparatus a coefficient multiplier circuit to perform polynomial multiplication, the coefficient multiplier circuit providing Number Theoretic Transform (NTT) and INTT (Inverse NTT) processing; and one or more accessory operation circuits coupled with the coefficient multiplier circuit, each of the one or more accessory operation circuits to perform a computation based at least in part on a result of an operation of the NTT/INTT coefficient multiplier circuit, wherein the one or more accessory operation circuits are to receive results of operations of the NTT/INTT coefficient multiplier circuit prior to the results being stored in a memory.

In Example 2, the one or more accessory operation circuits are to perform the accessory operations in a same cycle as the operations of the NTT/INTT coefficient multiplier circuit.

In Example 3, the performance of the one or more accessory operations overlaps at least in part with one or more other operations of the apparatus.

In Example 4, the polynomial multiplication includes multiplying a private polynomial with a public polynomial.

In Example 5, the computation by the one or more accessory operation circuits is performed without retrieving results of operations of the NTT/INTT coefficient multiplier circuit from memory.

In Example 6, the polynomial multiplication is performed for digital signature processing.

In Example 7, the digital signature processing is based on Dilithium technology.

In Example 8, the one or more accessory operation circuits inherit one or more side-channel attack countermeasures from INTT circuitry of the coefficient multiplier circuit.

In Example 9, the one or more inherited side-channel attack countermeasures include shuffling of processing order.

In Example 10, a method includes performing polynomial multiplication in an apparatus, the polynomial multiplication including Number Theoretic Transform (NTT) and INTT (Inverse NTT) processing; and performing one or more accessory operations in the apparatus, each of the one or more accessory operations including a computation based at least in part on a result of an operation of the NTT/INTT processing, wherein the one or more accessory operations are to receive results of the NTT/INTT processing prior to the results being stored in a memory.

In Example 11, the accessory operations are performed in a same cycle as the NTT/INTT processing.

In Example 12, performing of the one or more accessory operations overlaps at least in part with one or more other operations of the apparatus.

In Example 13, the polynomial multiplication includes multiplying a private polynomial with a public polynomial.

In Example 14, wherein the one or more accessory operations are performed without retrieving results of NTT/INTT operations from memory.

In Example 15, wherein the polynomial multiplication is performed for digital signature processing.

In Example 16, the digital signature processing is based on Dilithium technology.

In Example 17, wherein the one or more accessory operations inherit one or more side-channel attack countermeasures from the INTT processing.

In Example 18, the one or more inherited side-channel attack countermeasures include shuffling of processing order.

In Example 19, one or more non-transitory computer-readable storage mediums having stored thereon executable computer program instructions that, when executed by one or more processors, cause the one or more processors to perform operations including performing polynomial multiplication in an apparatus, the polynomial multiplication including Number Theoretic Transform (NTT) and INTT (Inverse NTT) processing; and performing one or more accessory operations in the apparatus, each of the one or more accessory operations including a computation based at least in part on a result of an operation of the NTT/INTT processing, wherein the one or more accessory operations are to receive results of the NTT/INTT processing prior to the results being stored in a memory.

In Example 20, the accessory operations are performed in a same cycle as the NTT/INTT processing.

In Example 21, performing of the one or more accessory operations overlaps at least in part with one or more other operations of the apparatus.

In Example 22, the polynomial multiplication includes multiplying a private polynomial with a public polynomial.

In Example 23, the one or more accessory operations are performed without retrieving results of NTT/INTT multiplier operations from memory.

In Example 24, the polynomial multiplication is performed for digital signature processing.

In Example 25, an apparatus includes means for performing polynomial multiplication in an apparatus, the polynomial multiplication including Number Theoretic Transform (NTT) and INTT (Inverse NTT) processing; and means for performing one or more accessory operations in the apparatus, each of the one or more accessory operations including a computation based at least in part on a result of an operation of the NTT/INTT processing, wherein the one or more accessory operations are to receive results of the NTT/INTT processing prior to the results being stored in a memory.

In Example 26, the accessory operations are performed in a same cycle as the NTT/INTT multiplier processing.

In Example 27, performing of the one or more accessory operations overlaps at least in part with one or more other operations of the apparatus.

In Example 28, the polynomial multiplication includes multiplying a private polynomial with a public polynomial.

In Example 29, the one or more accessory operations are performed without retrieving results of NTT/INTT from memory.

In Example 30, the polynomial multiplication is performed for digital signature processing.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
    a coefficient multiplier circuit to perform polynomial multiplication, the coefficient multiplier circuit providing Number Theoretic Transform (NTT) and INTT (Inverse NTT) processing; and
    one or more accessory operation circuits coupled with the NTT/INTT coefficient multiplier circuit, each of the one or more accessory operation circuits to perform a computation based at least in part on a result of an operation of the NTT/INTT coefficient multiplier circuit;
    wherein the one or more accessory operation circuits are to receive results of operations of the NTT/INTT coefficient multiplier circuit prior to the results being stored in a memory, and wherein the computation by the one or more accessory operation circuits is performed without retrieving the results of the operations of the NTT/INTT coefficient multiplier circuit from the memory.

2. The apparatus of claim 1, wherein the one or more accessory operation circuits are to perform the accessory operations in a same cycle as the operations of the NTT/INTT coefficient multiplier circuit.

3. The apparatus of claim 2, wherein the performance of the one or more accessory operations overlaps at least in part with one or more other operations of the apparatus.

4. The apparatus of claim 1, wherein the polynomial multiplication includes multiplying a private polynomial with a public polynomial.

5. The apparatus of claim 1, wherein the polynomial multiplication is performed for digital signature processing.

6. The apparatus of claim 5, wherein the digital signature processing is based on Crystals-Dilithium post-quantum digital signature technology.

7. The apparatus of claim 1, wherein the one or more accessory operation circuits inherit one or more side-channel attack countermeasures from INTT circuitry of the NTT/INTT coefficient multiplier circuit.

8. The apparatus of claim 7, wherein the one or more inherited side-channel attack countermeasures include shuffling of processing order.

9. A method comprising:
    performing polynomial multiplication in an apparatus, the polynomial multiplication including Number Theoretic Transform (NTT) and INTT (Inverse NTT) processing; and
    performing one or more accessory operations in the apparatus, each of the one or more accessory operations including a computation based at least in part on a result of an operation of the NTT/INTT processing;
    wherein the one or more accessory operations are to receive results of the NTT/INTT processing prior to the results being stored in a memory, and wherein the computation by the one or more accessory operations is performed without retrieving the results of the operations of the NTT/INTT processing from the memory.

10. The method of claim 9, wherein the accessory operations are performed in a same cycle as the NTT/INTT processing.

11. The method of claim 10, wherein performing of the one or more accessory operations overlaps at least in part with one or more other operations of the apparatus.

12. The method of claim 9, wherein the polynomial multiplication includes multiplying a private polynomial with a public polynomial.

13. The method of claim 9, wherein the polynomial multiplication is performed for digital signature processing.

14. The method of claim 13, wherein the digital signature processing is based on Crystals-Dilithium post-quantum digital signature technology.

15. The method of claim 9, wherein the one or more accessory operations inherit one or more side-channel attack countermeasures from the INTT processing.

16. The method of claim 15, wherein the one or more inherited side-channel attack countermeasures include shuffling of processing order.

17. One or more non-transitory computer-readable storage mediums having stored thereon executable computer program instructions that, when executed by one or more processors, cause the one or more processors to perform operations comprising:
    performing polynomial multiplication in an apparatus, the polynomial multiplication including Number Theoretic Transform (NTT) and INTT (Inverse NTT) processing; and
    performing one or more accessory operations in the apparatus, each of the one or more accessory operations including a computation based at least in part on a result of an operation of the NTT/INTT processing;

wherein the one or more accessory operations are to receive results of the NTT/INTT processing prior to the results being stored in a memory, and wherein the computation by the one or more accessory operations is performed without retrieving the results of the operations of the NTT/INTT processing from the memory.

18. The storage mediums of claim 17, wherein the accessory operations are performed in a same cycle as the NTT/INTT processing.

19. The storage mediums of claim 18, wherein performing of the one or more accessory operations overlaps at least in part with one or more other operations of the apparatus.

20. The storage mediums of claim 17, wherein the polynomial multiplication includes multiplying a private polynomial with a public polynomial.

21. The storage mediums of claim 17, wherein the polynomial multiplication is performed for digital signature processing.

* * * * *